US005193783A

United States Patent [19]

Capovilla

[11] Patent Number: 5,193,783

[45] Date of Patent: Mar. 16, 1993

[54] VALVE ARRANGEMENT FOR AIR REGULATION IN FOOD PRODUCT DRIERS

[75] Inventor: Andrea Capovilla, Isera, Italy

[73] Assignee: M.G. Braibanti S.p.A., Milan, Italy

[21] Appl. No.: 725,468

[22] Filed: Jul. 3, 1991

[30] Foreign Application Priority Data

Jul. 9, 1990 [IT] Italy ............................ 21462/90[U]

[51] Int. Cl.⁵ ............................................. F16K 51/00

[52] U.S. Cl. .................................... 251/144; 137/554

[58] Field of Search ................. 251/144, 336; 137/554

[56] References Cited

U.S. PATENT DOCUMENTS

| | | | |
|---|---|---|---|
| 1,349,568 | 8/1920 | Gammel . | |
| 3,065,949 | 11/1962 | De Frees | 251/144 X |
| 4,251,049 | 2/1981 | Muehl | 251/144 X |
| 4,440,379 | 4/1984 | Behle et al. | 251/144 |
| 4,456,220 | 6/1984 | Behle et al. | 251/144 |
| 4,569,365 | 2/1986 | Namand et al. | 137/554 |
| 4,934,403 | 6/1990 | Mooney et al. | 251/144 X |

FOREIGN PATENT DOCUMENTS

| | | |
|---|---|---|
| 0208179 | 1/1987 | European Pat. Off. . |
| 1569819 | 6/1969 | France . |
| 2030759 | 11/1970 | France . |
| 2137747 | 12/1972 | France . |
| 24189 | 11/1930 | Netherlands . |
| 1244725 | 9/1971 | United Kingdom . |

*Primary Examiner*—Martin P. Schwadron
*Assistant Examiner*—Kevin L. Lee
*Attorney, Agent, or Firm*—Cushman, Darby & Cushman

[57] ABSTRACT

A valve arrangement for air regulation in driers for foodstuff products, more particularly pasta, suitable for fitting to an aperture made in a wall of a drier including an external support body within which is provided a moving closure component which is selectively displaced by means of a suitable actuator. The actuator has a tapered section which is reversed towards and partly or completely engages in a matching additional housing section in a hole in an outer body of a hollow support.

20 Claims, 3 Drawing Sheets

VALVE ARRANGEMENT FOR AIR REGULATION IN FOOD PRODUCT DRIERS

BACKGROUND OF THE INVENTION

The present invention relates to a valve arrangement for regulating air in driers for foodstuff products.

Driers for foodstuff products at present use inlet and/or outlet air regulators including slide valves of the shutter or throttle type. Such valves receive an electrical actuation signal from processors or suitable electrical regulators, the electrical signal being transformed into movement of a pneumatic piston which reacts on the valve with relevant interposed actuating lever means.

Such arrangements have a number of disadvantages due to their particular design, the wear of components and the pneumatic actuation controlled by levers. They are subject to lack of accuracy in regulating the opening and/or closing, owing to the presence of levers and of the pneumatic actuation, and a slow operation of the electrical signal, owing to its transformation into pneumatic thrust.

In such known arrangements, owing to the presence of slideway guides, relevant seals, complications due to lever systems give rise to wear forces and/or imperfect regulation of the air passage, particularly under the high and variable operating temperature conditions present in driers. In addition, owing to the structure of the required means, the fitting to such driers in service, requires specific structural geometric shapes and, consequently, it is necessary to make numerous holes within the drier panels, with consequent considerable implementation costs.

In addition, the known regulation means must be suitably equipped with special securing plates, with consequent expense in the manufacture and location of such plates on the walls of the driers.

Yet another problem arises with the maintenance of all the components of the regulator arrangement, such as pneumatic pistons, lever systems, runner guides and seals which initially are also relatively expensive, in ensuring correct fitting to the drier.

Summary of the Invention

A purpose of the present invention is to achieve an arrangement for air regulation in driers for foodstuffs products which, while being structurally more simple, will also allow accurate air regulation at the inlet and/or outlet of the drier, eventually allowing forced air input, while completely eliminating losses from the required arrangements.

A further purpose is to achieve a valve arrangement for air regulation allowing very rapid and easy installation, high operating accuracy and a minimum of maintenance which can be quickly conducted.

These purposes according to the present invention are achieved by means of a valve arrangement for air regulation in driers for foodstuffs products, particularly pasta, suitable for location over an aperture made in a wall of driers of the type comprising an external support body on the inside of which a moving closure is provided, the moving closure being actuated selectively in its movement by means of suitable actuator means, characterised in that the closure component has a taper part turned towards and engaging at least partly within a matching additional housing in a hole in the outer body of the hollow support.

BRIEF DESCRIPTION OF THE DRAWINGS

The features and advantages of the present invention will appear more clearly from the following description with reference to the appended drawings, wherein.

DETAILED DESCRIPTION

Figure 1:
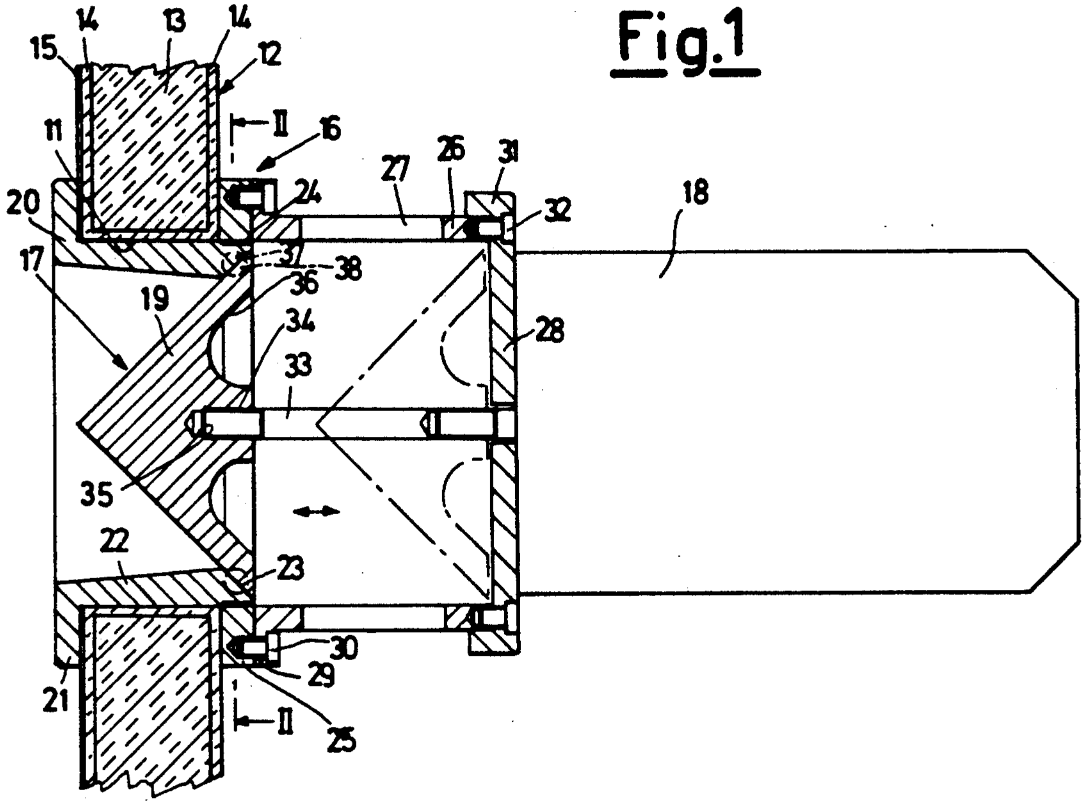
FIG. 1 is an elevation with part section of a valve arrangement for air regulation according to the present invention.

With reference to the drawing a valve arrangement for air regulation in driers for foodstuffs products, particularly pasta, is suitable for location within an aperture 11 made in a wall 12 of a drier, within the ceiling or simply a side wall.

In the example shown, the aperture 11 is of circular shape and the wall 12 of the drier includes an internal portion 13 made of polyurethane between surface facings 14 of fibre glass, and, in the part turned towards the inside of the drier, a further surface facing 15 of stainless steel sheet or aluminium.

The valve arrangement according to the present invention includes an external support body, having bearing reference 16, inside which a closure component 17 is provided, which is movable and selectively actuated by means of a suitable actuator 18, in the form of a servo motor or a compressed air cylinder with a suitable electro pneumatic locator arranged on the outside of the drier.

The closure component 17 has a taper part 19 which is turned towards a first part 20 of the outer support body 16. The first part 20 is bored, is of external cylindrical shape, and has a solid flange 21 at the end turned towards the inside of the drier, to fit upon the internal surface of aperture 11. The first portion 20 internally includes two truncated cone parts 22 and 23 converging towards an internal area of smaller diameter. The truncated cone part 23 which is turned towards the outside of the drier, also serves as housing means for at least part of the tapered part 19 of the closure component 17.

At the end turned towards the outside of the first part 20 of the external support component 16, the outer surface has a threaded portion 24, of at least the same diameter as or a smaller diameter than that of aperture 11, over which can be screwed a second flange 25 which is fully threaded internally. The outer support component 16 has, in addition, a second cylindrical part 26, also hollow, with radial intake apertures 27, axially in line and connected with the first bored part 20 and covered at one open free end by a plate 28 carrying the actuator means 18.

The end of the second cylindrical part 26 turned towards the first part 20 preferably has a flange 29 allowing the fitting of securing screws 30 parallel with the axial direction, together with the flange 25 of the first part 20. The plate 28 has a peripheral rim 31 projecting coaxially to the second cylindrical part 26 and able to surround its circumference at least partly, the plate 28 being linked to the second cylindrical part 26 by means of securing screws 32 located in respective holes, shown in the drawings, and also running parallel with the axial direction.

The actuator arrangement 18 is a linear movement servo motor from which projects a shaft 33 with a free threaded end 34 suitable for stable insertion into a central axial hole 35 provided in the body of the closure component 17. The closure component 17 preferably has in the part turned towards the outside of the drier, or towards the actuator arrangement 18, an annular weight-relieving recess 36.

In a preferred version, in order to improve the securing or housing of the taper part on the relevant housing part 23, an annular recess is provided as indicated by the dot and dash line 37, which is coaxial with the outer support component 16 and able to receive a packing seal 38, shown in dot and dash broken line.

Figure 2:
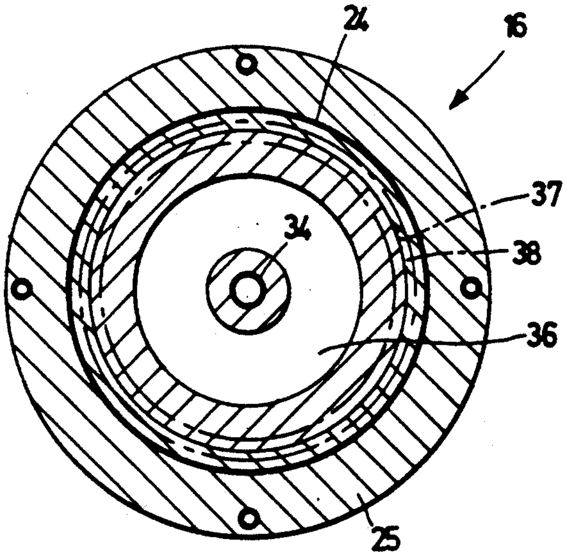
FIG. 2 is a section along II—II of the arrangement in FIG. 1.
Figure 3:
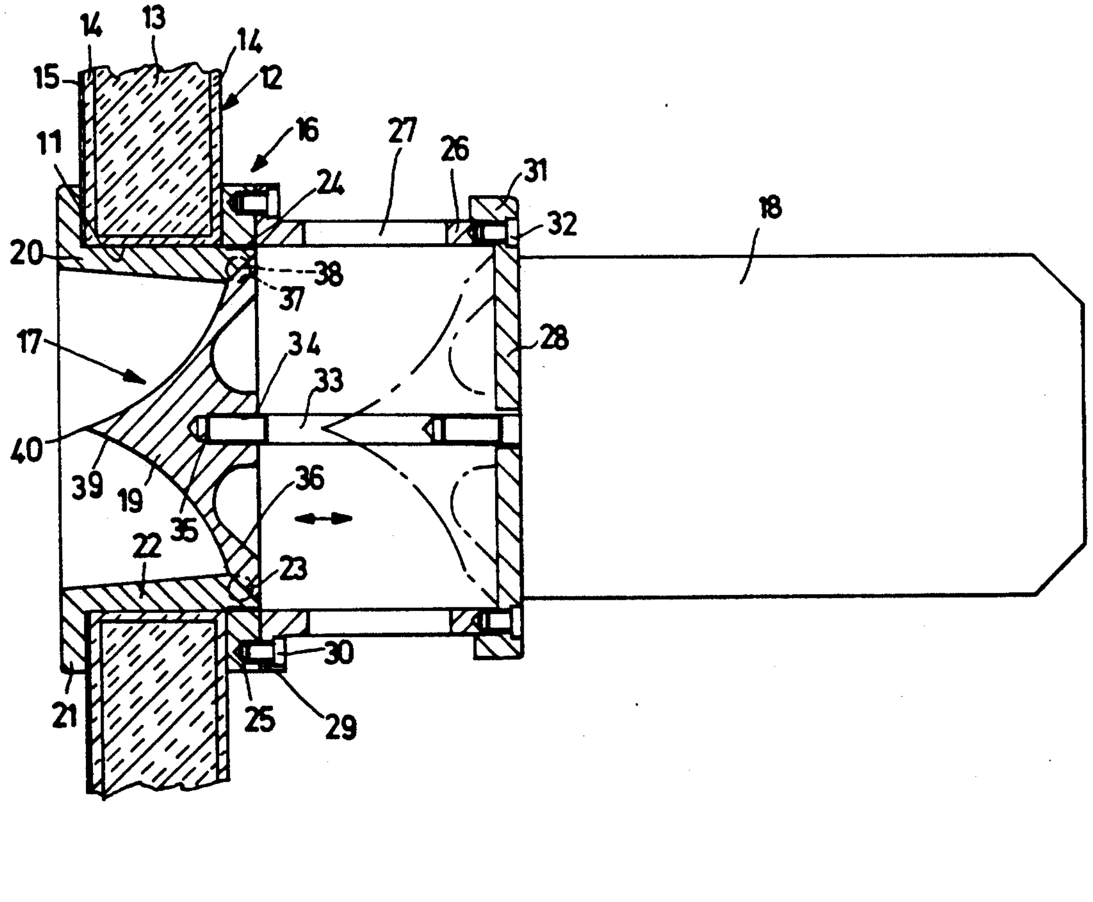
FIG. 3 is an elevation similar to FIG. 1 of a second version of the arrangement according to the present invention.

FIG. 3 shows a further version of a valve arrangement for air regulation according to the present invention, entirely similar to that in FIGS. 1 and 2, in which identical components bear the same reference numbers. The difference between the two versions consists mainly in the outer profile of the closure component 17. In this second version, the closure component has a tapered part 19 of which the outer surface connecting the apex 40 with the truncated cone housing part 23 has a concavely curved profile 39.

In this way, the difference between the first and second versions as described is mainly that the air capacity in the first described and illustrated case is of a linear nature, whereas in the second case it is of a exponential nature. An arrangement according to the present invention is thus particularly suited when designed according to the first version, for large air capacities, whereas with the design according to the second version, it is particularly suited for small volumes of air.

In the first example, an effective use is in an industrial drying production line for foodstuffs products, whereas the second example, can be effectively used in small experimental drying cells.

In both versions shown, the location and assembly of the component parts forming the arrangement are effected with the aid of the previously described flanges. The internal flange 20 is placed on the inside of the drier aperture 11, followed by the second flange 25 screwing it from the outside and bringing it to bear against the drier wall. In this way, it is sufficient to drill the drier insulating wall only in the position where it is intended to fit the valve arrangement for air regulation according to the invention.

All the remaining parts of the arrangement are suitably secured to the second cylindrical part 26 of the outer support component 16 which is installed after securing the first cylindrical part 20. In this way, it is possible to avoid all other drilling and adjustment required by known arrangements.

Figure 4:
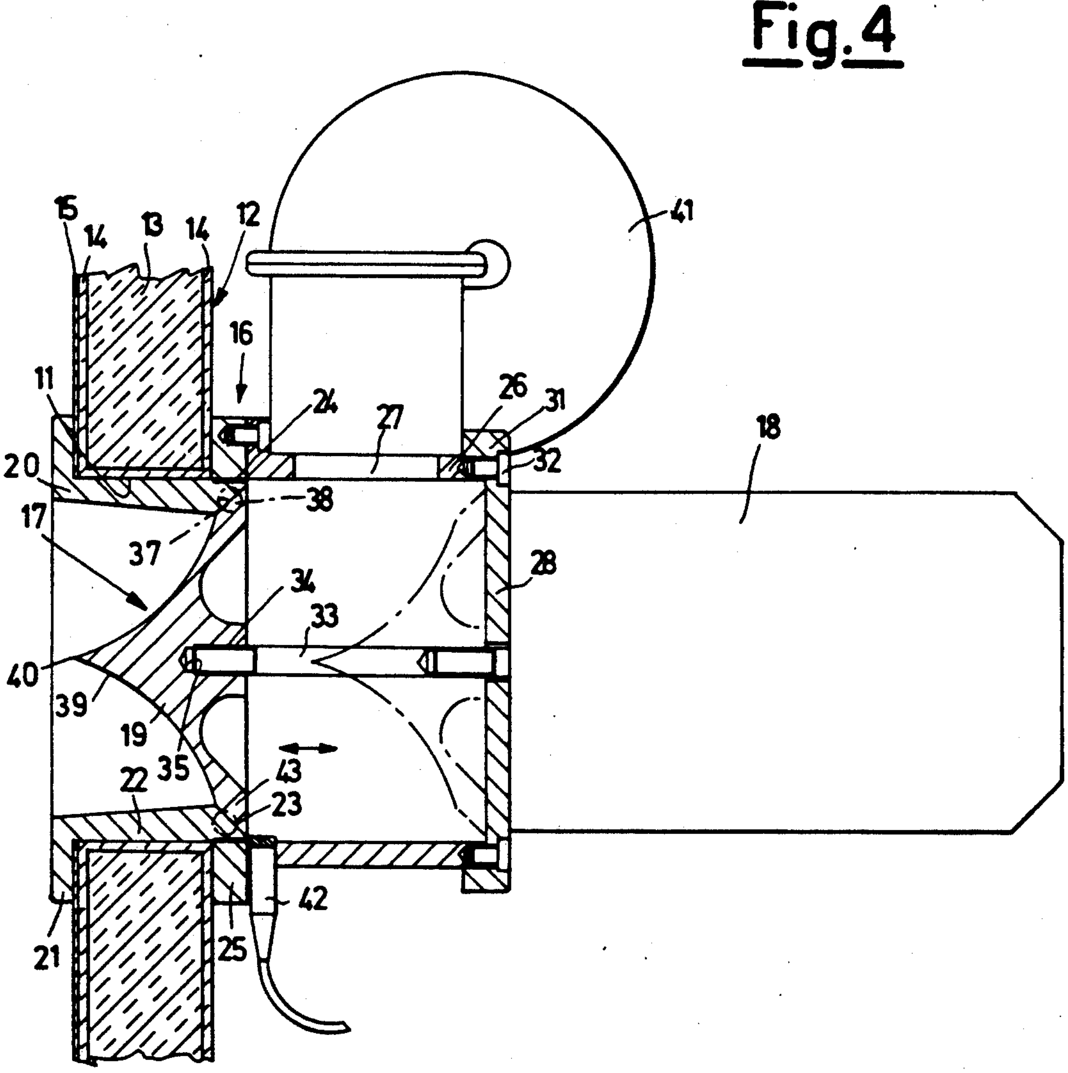
FIG. 4 shows another elevation of a third version of the arrangement according to the present invention.

FIG. 4 shows a further version, in which a forced air supply or extraction is provided for. In the second part 26 of the outer support component 16, a single radial aperture 27 is provided against which extractor and/or ventilator means 41 are placed, allowing forced drier inlet or outlet air movement. The operating signal to actuate the extractor and/or ventilator means 41 is provided by sensor means 42 which is able to detect the presence or otherwise of a widened lower end 43 of the closure component 17. When the actuator arrangement 18 moves the closure component 17 from its bearing contact position closing the regulator arrangement, the widened lower end 43 passing before the sensor arrangement 42 triggers actuation of the extraction and/or ventilator arrangement 41, thus achieving forced air movement.

The valve arrangement for air regulation in driers for foodstuffs products, particularly pasta, according to the present invention, thus has considerable advantages in relation to known types of arrangement.

It is in fact possible to achieve a high level of regulating accuracy as a result of the advantages of the mechanical shape, as well as the use of a linear movement servo motor-assisted actuator arrangement able to provide a real time response to the electrical signal provided, for instance, by a processor, not shown here. In addition, the mechanical design referred to above allows wear to be reduced to a minimum, thus ensuring freedom from losses.

As already outlined, the mechanical design allows quick and accurate fitting, only requiring a circular hole in the wall or ceiling of the drier. At the same time, the mechanical design is particularly simple and consequently allows highly cost effective manufacture.

In conclusion, the design simplicity, the ease of location in service and absolute absence of mechanical components directly subject to wear are a guarantee of safe and perfect operation of the arrangement according to the present invention, even in the presence of high temperatures.

I claim:

1. An air regulation valve for installation in an aperture formed in a wall of a foodstuff drier, which wall has an inner surface and an outer surface, and which aperture is defined by a peripheral surface extending thicknesswise of said wall, between said inner surface and said outer surface, said air regulation valve comprising:

an annular first closure component having a peripheral sidewall arranged to line said aperture of said wall of said drier, and radial flange means for mounting said first closure component to said wall of said drier with said peripheral sidewall lining said aperture;

said peripheral sidewall having means defining an internal peripheral surface including an axially outer, radially inner peripheral band which flares axially outwardly relative to a longitudinal axis of said valve;

an axially movable second closure component having an axially forwardly presented tapering peripheral surface arranged in one position of said second closure component to lie at least partially radially and axially within said first closure component and to have a said tapering peripheral surface thereof sealingly engaged with said inner peripheral band of said peripheral sidewall of said first closure component, and, in another position of said second closure component, to be withdrawn so that an annular ventilation gap exists between said inner peripheral band of said peripheral sidewall of said first closure component and said tapering peripheral surface of said second closure component; and an actuator mounted to said first closure component, so as to be disposed outside of said foodstuff drier; said actuator including a shaft means connected with said second closure component and power-operated means for reversibly moving said shaft for selectively moving said second closure component relative to said first closure component along said longitudinal axis betwen said one and said other positions of said second closure component;

said actuator is mounted to said first closure component by being coaxially mounted to an axially outer end radial flange of said radial flange means, by a cylindrical tubular part which is closed at an axially outer end thereof by closure means provided by an axially inner end of said actuator; and said cylindrical tubular part having means defining at least one aperture extending radially therethrough;

there being only one said aperture extending radially through said cylindrical tubular part; and further comprising an extractor mounted to said cylindrical tubular part, so as to extract moisture from within the drier through said aperture of said cylindrical tubular part.

2. The air regulation valve of claim 1, wherein:

said second closure component, axially inwardly from said tapering peripheral surface is conically tapered towards an axially inner end of said first closure component.

3. The air regulation valve of claim 1, wherein:

said second closure component has an axially outer end wall having means defining an axially outwardly opening recess therein, for lightening said second closure component in weight.

4. The air regulation valve of claim 1, wherein:

said first closure component comprises a tubular body which provides said peripheral sidewall, and two axially opposite external radial flanges which provide said radial flange means and are respectively arranged for engaging said inner and outer surfaces of said wall of said drier; said axially outer, radially inner peripheral band being provided on said tubular body; a second, axially inner, radially inner peripheral band provided on said tubular body so as to have an axially outer end thereof form an apex of minimum diameter with an axially inner end of said axially outer, radially inner peripheral band; said second, axially inner, radically inner peripheral band tapering axially inwardly along said longitudinal axis.

5. The air regulation valve of claim 4 wherein:

one of said radial flanges is threadedly connected with said tubular body.

6. The air regulation valve of claim 1, wherein:

said cylindrical tubular part is disconnectably connected to said outer end radial flange of said first closure component.

7. The air regulation valve of claim 1, wherein:

said closure means comprises a plate having an outer peripheral rim which circumferentially surrounds an axially outer end of said cylindrical tubular part; and said plate is disconnectably connected to said axially outer end of said cylindrical tubular part.

8. The air regulation valve of claim 1, wherein:

said extractor is power operated, and said valve further includes a sensor arranged to sense when said second closure component is withdrawn from said one position and operatively connected with said extractor for power-operating said extractor only when said second closure component is withdrawn from said one position.

9. The air regulation valve of claim 1, wherein:

said actuator is a servomotor-type linear actuator having said shaft as an output shaft thereof.

10. The air regulation valve of claim 1, wherein:

said actuator is a pneumatically operated, longitudinally expandable-contractile piston and cylinder arrangement having said shaft as an output piston rod thereof.

11. An air regulation valve for installation in an aperture formed in a wall of a foodstuff drier, which wall has an inner surface and an outer surface, and which aperture is defined by a peripheral surface extending thicknesswise of said wall, between said inner surface and said outer surface.

said air regulation valve comprising:

an annular first closure component having a peripheral sidewall arranged to line said aperture of said wall of said drier, and radial flange means for mounting said first closure component to said wall of said drier with said peripheral sidewall lining said aperture;

said peripheral sidewall having means defining an internal peripheral surface including an axially outer, radially inner peripheral band which flares axially outwardly relative to a longitudinal axis of said valve;

an axially movable second closure component having an axially forwardly presented tapering peripheral surface arranged in one position of said second closure component to lie at least partially radially and axially within said first closure component and to have a said tapering peripheral surface thereof sealingly engaged with said inner peripheral band of said peripheral sidewall of said first closure component, and, in another position of said second closure component, to be withdrawn so that an annular ventilation gap exists between said inner peripheral band of said peripheral sidewall of said first closure component and said tapering peripheral surface of said second closure component; and an actuator mounted to said first closure component, so as to be disposed outside of said foodstuff drier; said actuator including a shaft means connected with said second closure component and power-operated means for reversibly moving said shaft for selectively moving said second closure component relative to said first closure component along said longitudinal axis between said one and said other positions of said second closure component;

said actuator is mounted to said first closure component by being coaxially mounted to an axially outer end radial flange of said radial flange means, by a cylindrical tubualr part which is closed at an axially outer end thereof by closure means provided by an axially inner end of said actuator; and said cylindrical tubular part having means defining at least one aperture extending radially therethrough;

there being only one said aperture extending radially through said cylindrical tubular part; and further comprising a ventilator mounted to said cylindrical tubular part, so as to ventilate moisture from within the drier through said aperture of said cylindrical tubular part.

12. The air regulation valve of claim 11, wherein:

said ventilator is power operated, and said valve further includes a sensor arranged to sense when said second closure component is withdrawn from said one position and operatively connected with said ventilator for power-operating said ventilator only when said second closure component is withdrawn from said one position.

13. The air regulation valve of claim 11, wherein:

said second closure component, axially inwardly from said tapering peripheral surface is conically tapered towards an axially inner end of said first closure component.

14. The air regulation valve of claim 11, wherein:

said second closure component has an axially outer end wall having means defining an axially outwardly opening recess therein, for lightening said second closure component in weight.

15. The air regulation valve of claim 11, wherein:

said first closure component comprises a tubular body which provides said peripheral sidewall, and two axially opposite external radial flanges which provide said radial flange means and are respectively arranged for engaging said inner and outer surfaces of said wall of said drier; said axially outer, radially inner peripheral band being provided on said tubular body; a second, axially inner, radially inner peripheral band provided on said tubular body so as to have an axially outer end thereof form an apex of minimum diameter with an axially inner end of said axially outer, radially inner peripheral band; said second, axially inner, radially inner peripheral band tapering axially inwardly along said longitudinal axis.

16. The air regulation valve of claim 11, wherein:

one of said radial flanges is threadedly connected with said tubular body.

17. The air regulation valve of claim 11, wherein:

said cylindrical tubular part is disconnectably connected to said outer end radial flange of said first closure component.

18. The air regulation valve of claim 11, wherein:

said closure means comprises a plate having an outer peripheral rim which circumferentially surrounds an axially outer end of said cylindrical tubular part; and said plate is disconnectably connected to said axially outer end of said cylindrical tubular part.

19. The air regulation valve of claim 11, wherein:

said actuator is a servomotor-type linear actuator having said shaft as an output shaft thereof.

20. The air regulation valve of claim 11, wherein:

said actuator is a pneumatically operated, longitudinally expandable-contractile piston and cylinder arrangement having said shaft as an output piston rod thereof.

* * * * *